United States Patent [19]

Childress

[11] 4,146,106
[45] Mar. 27, 1979

[54] OPERATOR'S STATION AND PROTECTIVE CANOPY FOR MINE VEHICLE

[76] Inventor: Ray Childress, Box 853, Richlands, Va. 24641

[21] Appl. No.: 820,399

[22] Filed: Jul. 29, 1977

[51] Int. Cl.² ............................................. B62D 27/06
[52] U.S. Cl. .............................. 180/77 MC; 175/219; 299/12
[58] Field of Search ........................ 175/219; 299/12; 180/77 MC, 1 R; 280/8; 214/1 MS

[56] References Cited

U.S. PATENT DOCUMENTS

| | | | |
|---|---|---|---|
| 2,759,550 | 8/1956 | Moorehead | 280/43.15 X |
| 3,937,517 | 2/1976 | Donovan et al. | 299/12 X |
| 4,022,026 | 5/1977 | Childress | 175/219 X |
| 4,065,167 | 12/1977 | Wright | 175/219 X |

*Primary Examiner*—Joseph F. Peters, Jr.
*Assistant Examiner*—Michael Mar
*Attorney, Agent, or Firm*—Littlepage, Quaintance, Murphy, Richardson and Webner

[57] ABSTRACT

An operator's station on a sub-chassis is supported for vertical movement on a mine car chassis. A vertically adjustable canopy is supported on the sub-chassis.

4 Claims, 5 Drawing Figures

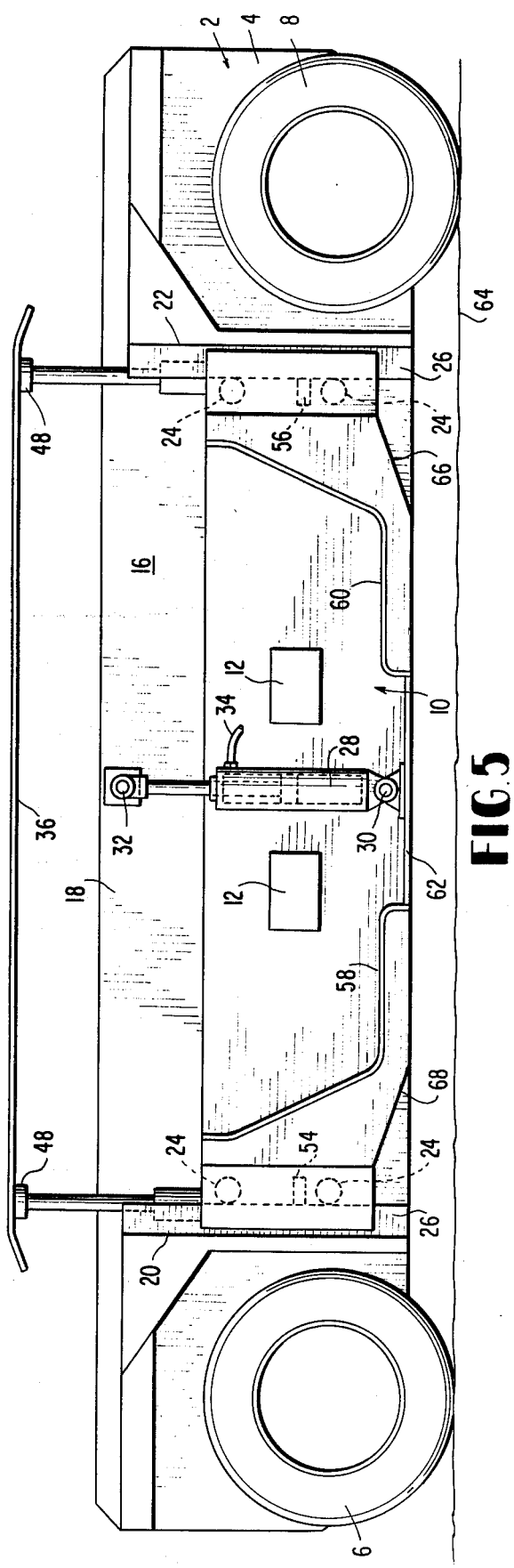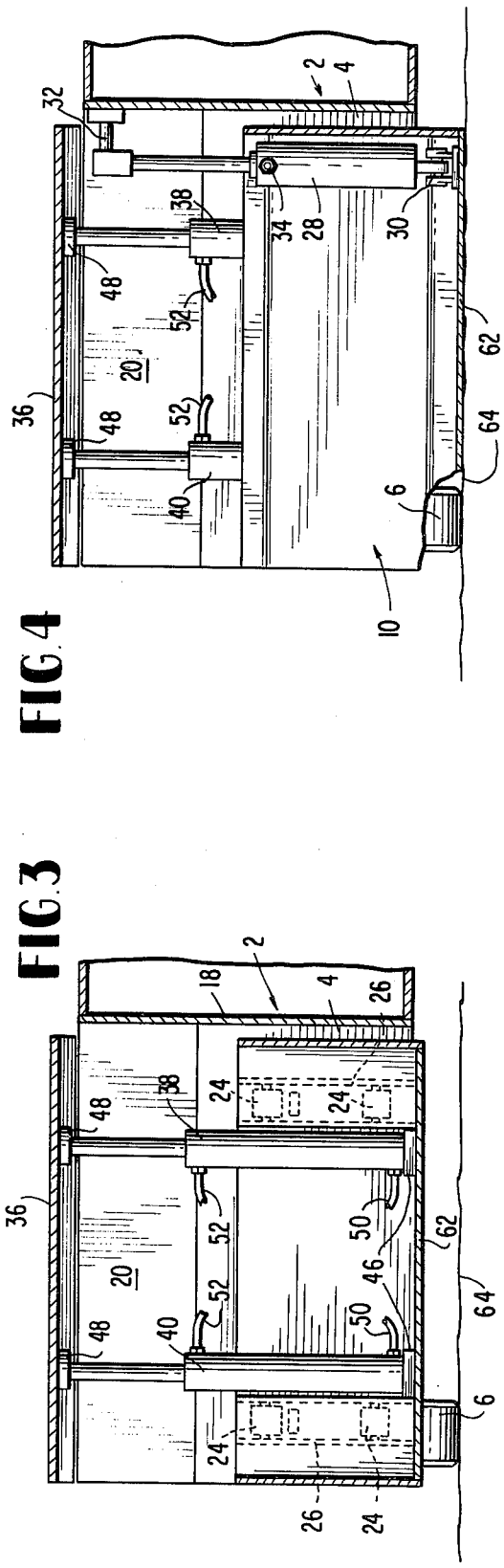

OPERATOR'S STATION AND PROTECTIVE CANOPY FOR MINE VEHICLE

FIELD OF INVENTION

Motor vehicles, Mine cars and controls, selectively positioned seat and associated controls.

OBJECTS

In the lower coal seams it is extremely hazardous for the operator to perform his duties safely and comfortably. The lower the seam becomes, the more cramped and hazardous it becomes for the operator, especially in mining vehicles such as shutter cars, scoops and other haulage equipment.

In mine vehicles, such as shuttle cars, it is usual for an operator's station to be mounted as low as possible on one side of the car so that the car may be run under low roofs. There are, however, occasions when it would be desirable for the operator to be positioned higher, and he also needs canopy protection from objects dislodged from directly overhead, and it is important that the canopy and its support be as strong as possible. The objects now are, first, to provide a sub-chassis containing oppositely-facing seats and an operator's control station therebetween, which is vertically movable in a well on one side of a shuttle car, which is movable between a lowermost "floating" position in which the bottom of the sub-chassis moves along very close to the ground, and an elevated position in which the operator is positioned higher. In its higher position, it is preferred that the top of the sub-chassis be below the level of the top of the car so as to avoid damage by low objects. Means such as a hydraulic jack is provided for either elevating the sub-chassis or for allowing it to rest upon or "float along" the ground. By this means, the maximum of the available vertical dimensions are utilized.

In conjunction with the above, it is further intended to provide a vertically adjustable canopy supported on the sub-chassis so that, when the sub-chassis rests upon the ground, the canopy receives its support through the sub-chassis directly from the ground. By this means the maximum strength of support for the canopy is obtained.

These and other objects will be apparent from the following specification and drawings, in which:

FIG. 3 is a cross-section along the lines 3—3 of FIG. 1;

FIG. 4 is a cross section along the lines 4—4 of FIG. 1; and,

FIG. 5 is a view similar to FIG. 1 but showing the sub-chassis in an elevated position and the canopy in a lowered position relative to the sub-chassis.

Figure 1:
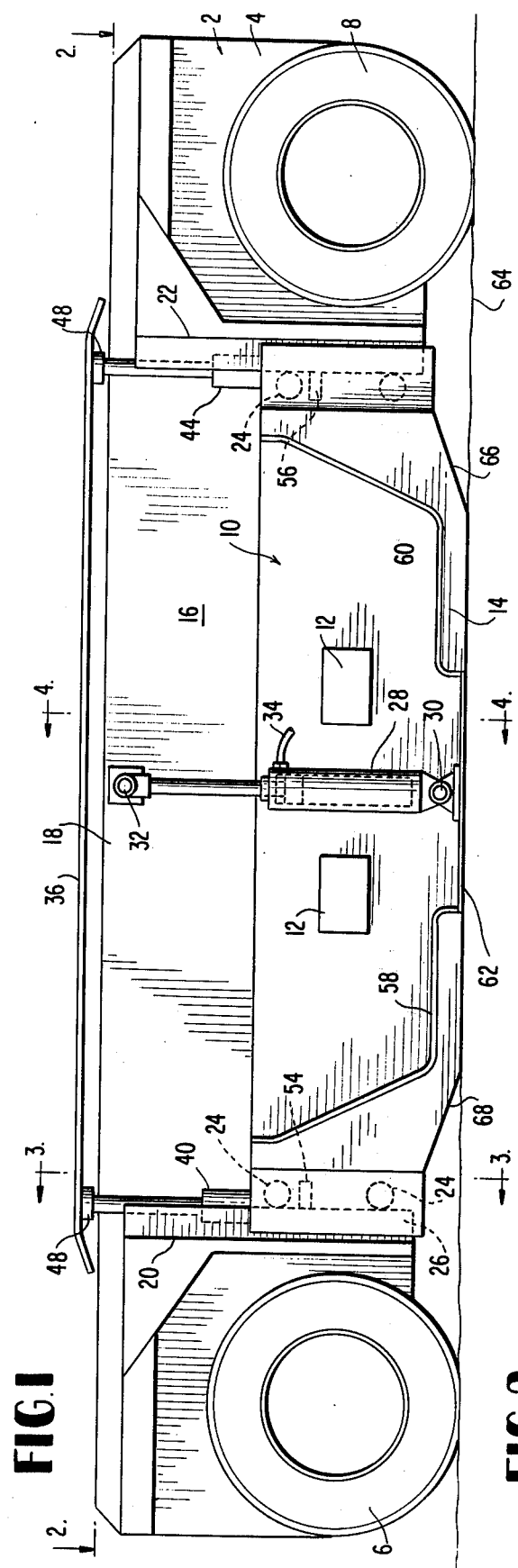
FIG. 1 is a side elevation of the shuttle car incorporating the invention, with the sub-chassis in lower-most position and the canopy in a lower position relative to the sub-chassis.
Figure 2:
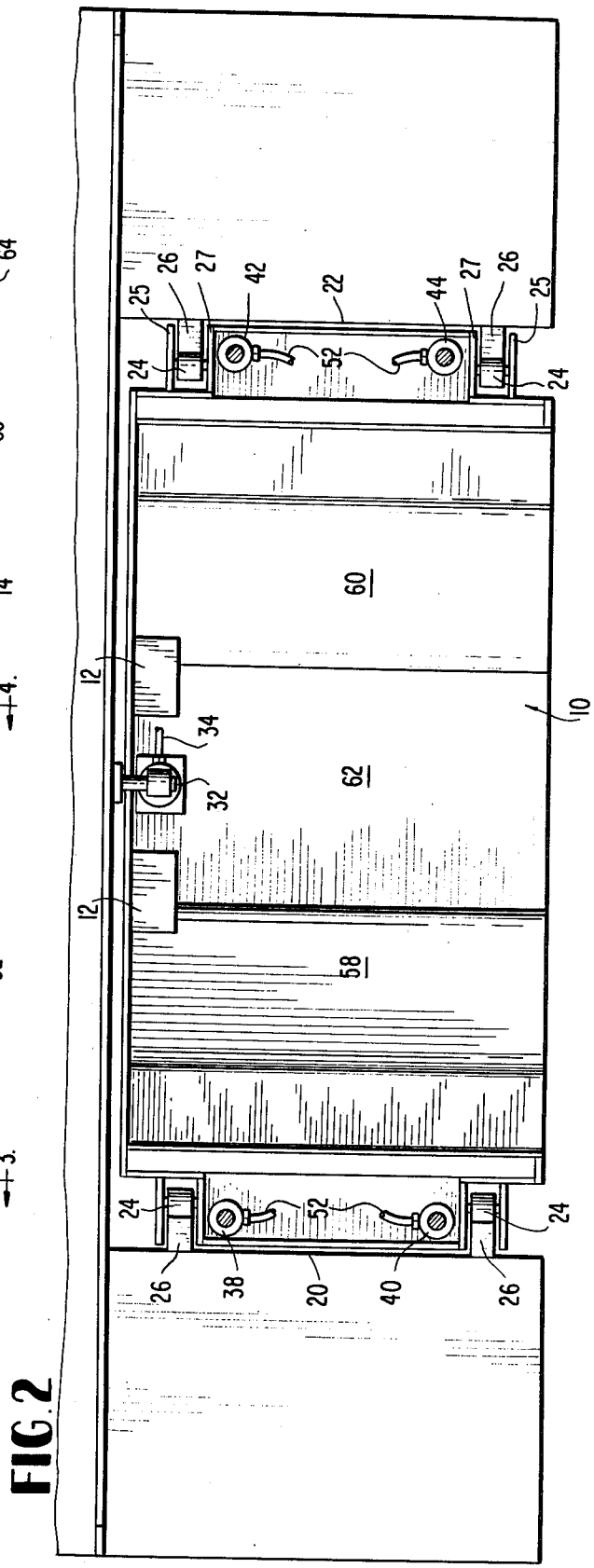
FIG. 2 is a top plan view of the sub-chassis with the canopy removed.

Referring now to the drawings, in which like reference numerals denote similar elements, there is shown a shuttle car 2 having a main chassis 4 with pairs of wheels 6 and 8 at each end. Except for the operator's station with its protective canopy, the shuttle car is conventional with the usual power and steering mechanism and cargo-carrying provisions and it may be of any desired width, and considerably longer than as illustrated. On one side of the shuttle car is an operator's station 10 having controls 12 which are diagrammatically illustrated. The operator's station is disposed in a sub-chassis 14 which is vertically movable in a well 16 in the main chassis, the well being defined by a longitudinal side wall 18 and end walls 20 and 22 all rigidly affixed in the main chassis. Sets of rollers 24 at each end of sub-chassis 14 ride along rails 26 supported on the end walls 20 and 22 of the well, and plates 25 and 27 between which the rollers are mounted on the sub-chassis embrace opposite sides of the rails 26 so that the sub-chassis will not bind, cock or dislodge as it moves freely upwardly and downwardly in the well. A hydraulic jack 28 whose cylinder is pivoted as at 30 to the floor 62 of the sub-chassis and whose rod is pivoted as at 32 to the longitudinal side wall 18 of the main chassis is provided with a hydraulic pressure fluid line 34 via which pressure fluid is provided from pressure fluid line 34 via which pressure fluid is provided from a suitable source. Controls, not shown, are provided for either energizing the jack with pressure fluid, or for releasing pressure fluid from the jack so that it is free to move in either direction. When pressure fluid is supplied via line 34, sub-chassis 14 is elevated (FIG. 5), and when the pressure fluid is released, the sub-chassis lowers to a downwardly retracted position (FIG. 1).

A canopy 36 over the operator's station 10 is vertically adjustable, for example, by hydraulic jacks 38, 40, 42 and 44 whose cylinders are mounted on the sub-chassis as at 46 and whose rods are connected to and support the canopy as at 48. Hydraulic pressure and return fluid lines 50 and 52 which are supplied from a hydraulic pressure fluid supply system and which is provided with suitable controls to provide the motive fluid for raising the canopy relative to the sub-chassis (FIG. 5) or lowering the canopy relative to the sub-chassis (FIG. 1). Stops 54, 56 on rails 26 limit the downward retractive movement of the sub-chassis. Oppositely facing seats 58 and 60 support the operator so that the operator can manipulate the shuttle car in either direction. In its lowermost position, the floor 62 of the shuttle car rides along or closely adjacent to the somewhat irregular mine floor 64, and upwardly inclined skid-like side plates 66 and 68 at each end of the sub-chassis are provided so that the sub-chassis will ride sled-like along the irregular mine floor. If desired, plates may be provided between the side walls 66 and 68 so that the sub-chassis will slide toboggan-like along the irregular mine floor.

In its downwardly retracted position, the sub-chassis 14 is free to "float" or move freely upwardly and downwardly as it rides along on or close to the mine floor and in this condition, if a heavy load, such as the falling mine roof, is imposed upon canopy 36, the latter receives its support directly from the mine floor as soon as the bottom of the sub-chassis engages the mine floor, if it has not already done so. A suitable relief valve may be provided for the hydraulic supply line 34 of hydraulic jack 28 so that even if the sub-chassis is elevated, an over-powering load imposed upon a canopy 36 will force the sub-chassis down against the ground and thereby provide ground support.

I claim:

1. An operator's station for an ambulatory mine vehicle having a chassis with a well having an open-top and bottom defined between spaced front and rear ends, a sub-chassis comprised of an open-top vessel adapted to skid along the ground as said vehicle ambulates, said vessel having vertical front, rear and opposite side walls and a bottom plate extending between said front, rear and opposite side walls, said bottom plate having upwardly inclined skid plates at front and rear ends thereof adapted to ride up and over obstructions on the ground and thereby cause said vessel to float over said obstructions, antifriction means for mounting the front and rear walls of said vessel on the front and rear ends of said well for free, non-binding vertical movement therein, and means engaged between said vehicle chassis and said sub-chassis for alternatively elevating the latter above the ground or for permitting the latter to rest freely on the ground.

2. An operator's station for a mine vehicle as claimed in claim 1, the anti-friction means mounting the front and rear walls of said vessel on the front and rear ends of said walls for vertical movement therein comprising cooperating rails and rollers on the front and rear walls of said vessel and the ends of said well.

3. An operator's station for a mine vehicle as claimed in claim 1, a canopy over said vessel, and vertically adjustable means engaging between said vessel and said canopy for supporting said canopy at selected positions above the vessel.

4. An operator's station for a mine vehicle as claimed in claim 1, said vertically adjustable means comprising hydraulic jacks connected between said canopy and said vessel, and means for supplying pressure fluid to said jacks.

* * * * *